United States Patent

Suda et al.

[11] Patent Number: 5,237,861
[45] Date of Patent: Aug. 24, 1993

[54] MAGNETIC DISK INSPECTION APPARATUS

[75] Inventors: Koichi Suda; Shinichi Nomura, both of Narashino, Japan

[73] Assignee: Seiko Seiki Kabushiki Kaisha, Japan

[21] Appl. No.: 731,753

[22] Filed: Jul. 16, 1991

[30] Foreign Application Priority Data

Jul. 19, 1990 [JP] Japan ............................ 2-191158

[51] Int. Cl.⁵ .......................... G01B 21/30; G01B 7/34
[52] U.S. Cl. ........................................................ 73/105
[58] Field of Search ................................. 73/105, 104

[56] References Cited

U.S. PATENT DOCUMENTS

| 3,504,552 | 4/1970 | Hiller | 73/105 X |
| 3,724,626 | 5/1973 | Roberts et al. | 356/371 |
| 4,560,924 | 12/1985 | Nordberg | 73/105 X |
| 4,802,042 | 1/1989 | Strom | 360/103 |
| 4,811,594 | 3/1989 | Dvorsky | 73/104 |
| 4,829,249 | 5/1989 | Matsushita et al. | 324/212 |
| 4,879,672 | 11/1989 | Pombrio, Jr. | 324/162 X |

Primary Examiner—Tom Noland
Attorney, Agent, or Firm—Bruce L. Adams; Van C. Wilks

[57] ABSTRACT

A magnetic disk inspection apparatus for inspecting protuberance on a surface of the magnetic disk. The apparatus includes an inspection head detecting the protuberance by a piezosensor, and rotating speed control circuit controlling a rotating speed of the magnetic disk held by a rotary holder member. The rotating speed control circuit generates a different speed increasing rate for each of concentric zones formed by dividing into a plurality of sections in a radial direction of the magnetic disk to keep a floating height of the inspection head in a predetermined constant value.

3 Claims, 2 Drawing Sheets

MAGNETIC DISK INSPECTION APPARATUS

BACKGROUND OF THE INVENTION

The present invention relates to a magnetic disk inspection apparatus and more particularly, to a magnetic disk inspection apparatus wherein the peripheral speed of an inspecting portion of a rotating magnetic disk corresponding to an inspection head is approximately constant.

Disk media such as a magnetic disk which must have a high degree of flatness on their surface have been inspected by dedicated inspection apparatus referred to as a "glide tester". This inspection method will be explained with reference to FIG. 2. In the drawing, a head 5 floats at a certain height H due to an air flow produced by the rotation of a magnetic disk 1. This floating height H is determined by the relative speed between the disk 1 and the head 5. If any protuberance 15 higher than the floating height H exists on the disk surface, the protuberance 15 impinges against the head 5, whereas in the case of another protuberance 16 which is lower than the floating height H, the head 5 does not impinge against it but passes by. Therefore, if a piezosensor 17 is provided to the head 5, the sensor 17 can detect this impingement and can find any protuberances which are higher than the floating height H. In FIG. 2, symbols IMP and OMP represent innermost periphery and outermost periphery of the region to be inspected, respectively.

During the inspection operation where the magnetic disk is rejected because protuberance higher than the floating height H exists, a predetermined floating height H must be always kept irrespective of the position of the head over the disk surface, as shown in FIG. 3. In FIG. 3, symbol A1 represents the case where the floating height H is set to be great and A2 represents the case where it is set to be small. In order to keep the floating height H constant, the relative speed between the disk 1 and the head 5 or in other words, the peripheral speed, must be kept constant. Since the head 5 is moved in a radial direction by a carriage 6, the peripheral speed is kept constant by changing the rotating speed of a spindle 2 which rotates the disk 1, in accordance with the radial position of the head 5. When the head 5 exists at a position of a radius r (mm) as shown in FIG. 4, the rotating speed $\omega$ (rpm) of the spindle and the peripheral speed V (mm/sec) of the head 5 with respect to the disk 1 have the following relation:

$$\omega = \frac{60 V}{2\pi r}$$

In other words, the rotating speed $\omega$ and the radius r are inversely proportional, and this relation is as shown in FIG. 5 wherein the rotating speed $\omega$ and the radius r are plotted on the ordinate and on the abscissa, respectively. If the relative speed V between the head 5 and the disk 1 is to be kept constant, the rotating speed becomes higher as the head moves toward the inner peripheral side. In FIG. 5, curve B1 represents the case where a peripheral speed is higher and B2 does the case where a peripheral speed is lower. To provide this rotating speed curve, it has been customary in the past to employ a method which prepares a conversion table into which numeric values of this curve are written beforehand, reads out one by one a rotating speed value corresponding to a carriage position from the conversion table with the movement of the carriage and applies this value to a spindle driving apparatus so as to control the peripheral speed constant.

In the method described above which determines the rotating speed from the conversion table, a plurality of conversion tables are necessary in accordance with a plurality of floating height values and the conversion table must be expanded in order to obtain higher conversion accuracy. Therefore, a large capacity memory is necessary for the conversion table. Another problem is that a control circuit for selecting the conversion tables and for the readout operation gets rather complicated.

SUMMARY OF THE INVENTION

It is an object of the present invention to provide a magnetic disk inspection apparatus which is able to make constant peripheral speed control by a simple and low cost circuit.

The present invention employs means for generating directly a rotating speed curve instead of using a conversion table. This means has the construction which changes linearly the rotating speed in accordance with the movement of the carriage. To the curve shown in FIG. 5 is divided into a plurality of zones and linear approximation is made for each zone so as to accomplish this curve. In other words, linear approximation is accomplished by means for calculating in advance the inclination of a line (slope value) connecting the start point and end point of each zone and a starting speed by software, and applying these values to hardware when the carriage reaches the starting point of each zone, and means for changing linearly the rotating speed on the basis of these values.

According to the construction described above, the rotating speed of the spindle increases at a slope value which is given in advance, when the carriage moves from the outer peripheral side to the inner peripheral side. When the carriage reaches the final point of each zone, the software gives the slope value of the next zone to the hardware. In this manner, an increase rate of a rotating speed becomes greater as the carriage moves further inward, and a speed change is substantially in conformity with an intended speed curve.

The greater the number of divisions (zones), the higher becomes the accuracy of the rotating speed. Therefore, the number of divisions is determined in accordance with a desired accuracy. If the number of divisions is too great, however, zone switching times constitute a greater proportion and through-put drops. Therefore, the number of divisions must be set to a suitable one.

DETAILED DESCRIPTION OF THE PREFERRED EMBODIMENTS

Hereinafter, embodiments of the present invention will be explained with reference to the drawings.

Figure 1:
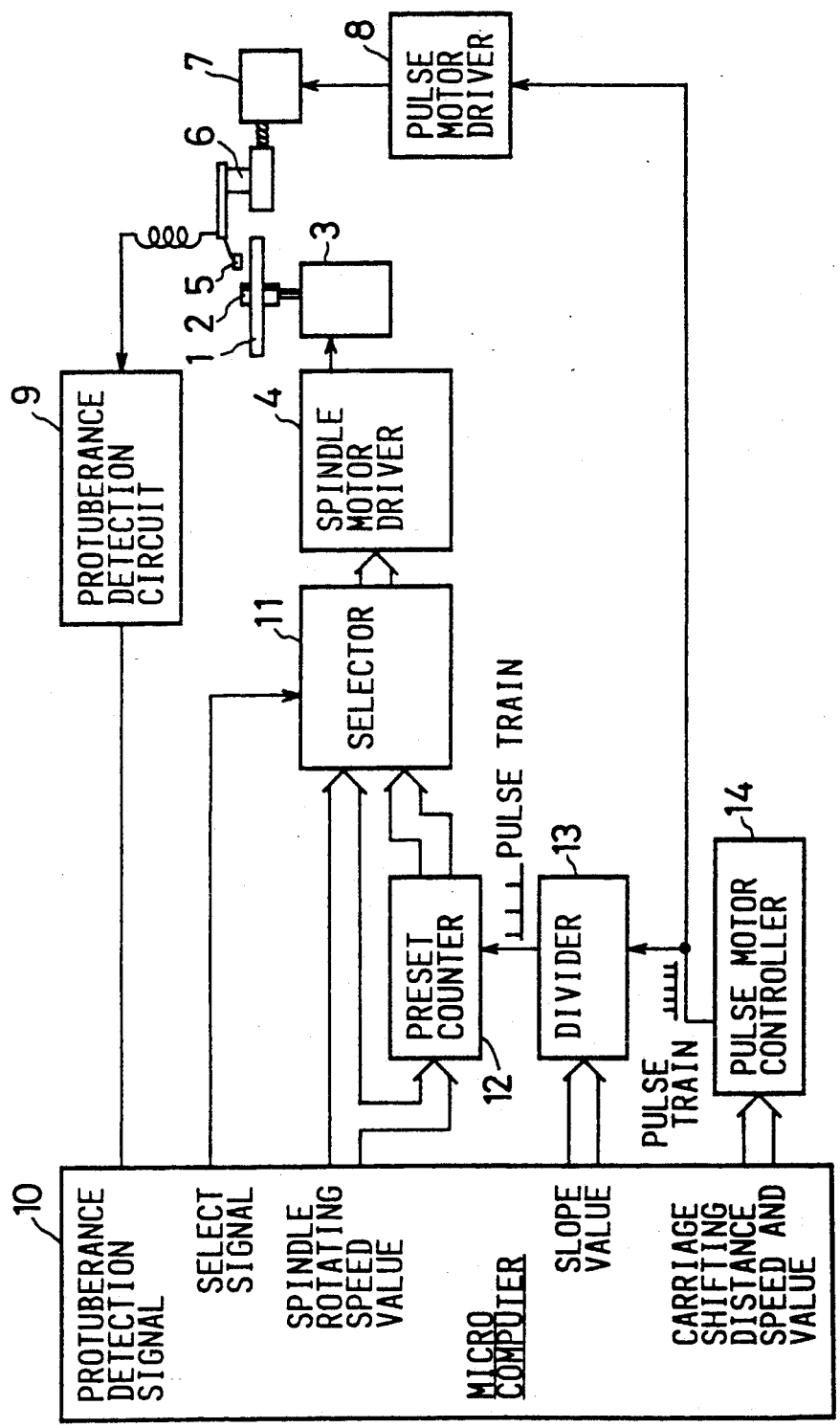
FIG. 1 is a block circuit diagram showing an embodiment of the present invention.
Figure 2:
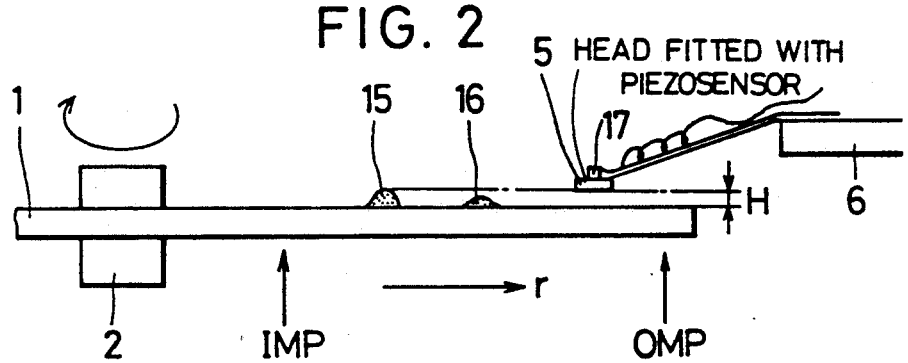
FIG. 2 is an explanatory view of the principle for detecting protuberances of a disk.
Figure 3:
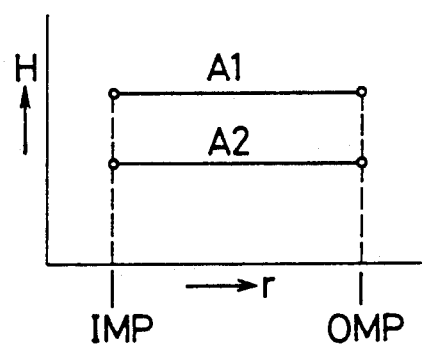
FIG. 3 is a diagram showing the floating heights of a head.
Figure 4:
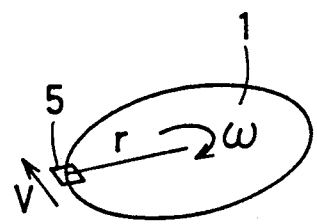
FIG. 4 is an explanatory view for explaining the relation between a rotating speed and a peripheral speed.
Figure 5:
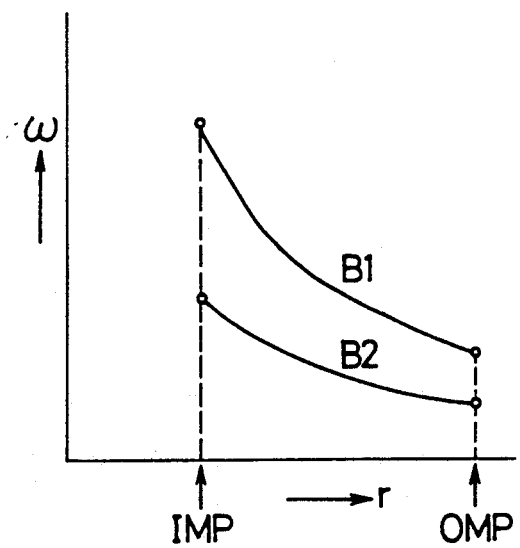
FIG. 5 is a speed curve diagram showing the relation between a head position and a rotating speed of a spindle.

FIG. 1 illustrates an embodiment of the present invention in a block diagram. A disk 1 to be inspected is fitted to a spindle 2 and is rotated by a spindle motor 3. When a rotating speed instruction value is applied to a motor driver 4, the spindle motor driver 4 rotates the motor 3 at that speed. On the other hand, a head 5 is fitted to a carriage 6 and can be moved in a radial direction of the disk by a pulse motor 7. When a pulse is inputted, a pulse motor driver 8 rotates by a predetermined angle the pulse motor 7. A piezosensor (not shown) is fitted to the head 5 and its output signal is connected to a protuberance detection circuit 9. The protuberance detection circuit 9 has the functions of shaping and counting signal waveforms outputted from the piezosensor.

A microcomputer 10 controls all the operations of the apparatus. A selector 11 selects whether a spindle rotating speed value is received directly from the microcomputer 10 or from a preset counter 12, and is changed over by a select signal from the microcomputer 10. Reference numeral 14 represents a pulse motor controller, which receives a carriage shifting speed value and shifting distance value from the microcomputer 10 and generates a pulse train in accordance with these values. The pulse train drives the pulse motor 7 through the pulse motor driver 8 and the pulse train is also applied to a frequency divider 13. When a slope value is given from the microcomputer 10, the frequency divider 13 outputs a pulse train whose frequency is divided in accordance with the slope value. When the slope value is 5, for example, the frequency division ratio is 5 and an output is generated every five input pulses. The output of the frequency divider 13 is inputted to a count-up terminal of the preset counter 12 and increments the rotating speed by a minimum unit (e.g. 10 rpm). Accordingly, the rotating speed value of the preset counter 12 increases with the movement of the carriage 6 at a rate designated by the slope value.

The microcomputer 10 calculates in advance an initial rotating speed and a slope value of each zone from a given peripheral speed, the number of zones and the innermost and outermost radii and stores these values in memory.

Figure 6:
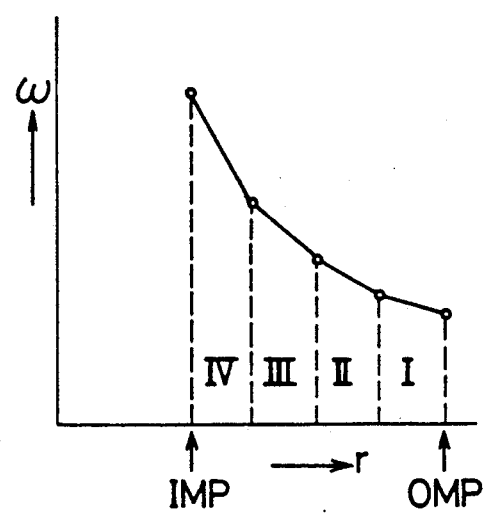
FIG. 6 is a speed diagram obtained by dividing the speed curve into four zones and making a linear approximation of the curve.

Explanation will next be given of this embodiment of the case where a region or area of the disk 1 from the outermost peripheral portion to the innermost peripheral portion is divided into four zones as shown in FIG. 6. The shifting of the head 5 is in the radial direction from the outermost peripheral portion to the inner peripheral portion. At first, the head is moved to the outermost periphery or in other words, to the start position of the zone I, and the slope value and initial rotating speed value of the zone I are given to the frequency divider 13 and to the preset counter 12, respectively. When the select signal is changed over to the preset counter side, the spindle 2 rotates at the initial rotating speed. Next, when the shifting speed and distance of the carriage 6 are supplied to the pulse motor controller 14, the carriage starts shifting. The rotating of the spindle 2 increases with the shift of the carriage 6. When the final portion of the zone I is reached, the slope value of the zone II that has been calculated already is set to the frequency divider 13 and the shifting speed and distance of the carriage 6 are given once again to the pulse motor controller 14. In this zone II, the rotating speed of the spindle 2 increases at a higher rate than in the zone I. The head 5 moves up to the zone IV in the same way as above. In this manner, constant peripheral speed control can be made by making a linear approximation of the rotating speed curve. When calculation is made for the approximation error, this error is 1.7% when a 3.5-in disk having the outermost periphery of 44 mm and the innermost periphery of 20 mm is divided into the four zones. The error is 0.5% when the disk is divided into eight zones. The error of this extent can be neglected completely from the practical aspect.

According to this construction, the approximation error becomes greater at the inner peripheral side of the disk region. Accordingly, the error can be reduced without increasing the number of divisions by a method which does not equally divide the disk by divides it more finely on the inner peripheral side.

As described above, the present invention can make constant peripheral speed control of a relatively simple circuit within an error range which does not pose any practical problem, and can therefore reduce the cost of an inspection apparatus. Since the rotating speed increments by a minimum unit of spindle rotation speed setting resolution in this apparatus, the speed change becomes extremely smooth and the floating height of the head is stabilized.

What is claimed is:

1. A magnetic disk inspection apparatus comprising:
   a rotary holder member for rotatably holding a magnetic disk to be inspected;
   an inspection head for detecting protuberances on a surface of said magnetic disk held by said rotary holder member;
   rotary holder member driving means for rotating said rotary holder member, thereby floating said inspection head from the surface of the said magnetic disk;
   inspection head driving means for shifting said inspection head in a radial direction of said magnetic disk; and
   rotating speed control means for controlling the rotating speed of said rotary holder member driving means to keep a floating height of said inspection head at a predetermined value, wherein said rotating speed control means generates a different speed increasing rate for each concentric zone formed by dividing said magnetic disk into a plurality of sections in a radial direction thereof.

2. The magnetic disk inspection apparatus in accordance with claim 1, wherein said rotating speed control means includes means for generating the speed increasing rate in relation to a position of said inspection head in each concentric zone.

3. The magnetic disk inspection apparatus in accordance with claim 1, wherein said inspection head has a piezosensor for detecting protuberances on the surface of said magnetic disk.

* * * * *